(12) United States Patent
Lang

(10) Patent No.: US 8,206,259 B2
(45) Date of Patent: Jun. 26, 2012

(54) SINGLE PLANET GEAR ROTARY ACTUATOR

(75) Inventor: David J. Lang, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 379 days.

(21) Appl. No.: 12/618,894

(22) Filed: Nov. 16, 2009

(65) Prior Publication Data
US 2011/0118076 A1 May 19, 2011

(51) Int. Cl.
*F16H 57/08* (2006.01)
(52) U.S. Cl. .......................................... 475/348; 475/341
(58) Field of Classification Search .................. 475/221, 475/330, 338, 340, 341, 348
See application file for complete search history.

(56) References Cited

U.S. PATENT DOCUMENTS

| | | | |
|---|---|---|---|
| 3,478,623 A | 11/1969 | Noguchi | |
| 4,721,016 A * | 1/1988 | Burandt | 475/342 |
| 4,742,730 A | 5/1988 | Dorn et al. | |
| 4,751,855 A * | 6/1988 | Hudson | 475/159 |
| 4,825,723 A | 5/1989 | Martin | |
| 4,848,663 A | 7/1989 | Sherbrooke | |
| 5,211,611 A | 5/1993 | Lammers et al. | |
| 2007/0249460 A1 * | 10/2007 | Schulz et al. | 475/342 |
| 2008/0261742 A1 * | 10/2008 | Ando et al. | 475/160 |

* cited by examiner

*Primary Examiner* — Justin Holmes
(74) *Attorney, Agent, or Firm* — Stephen G. Mican

(57) ABSTRACT

A rotary actuator comprises a rotatable output ring with a generally denticulate inner surface region and an output ring axis of rotation; a pair of stationary rings, each with a generally denticulate inner surface region and a stationary ring axis, each located on a different end of the output ring with the stationary ring axes in general alignment with the output ring axis; a generally cylindrical planet comprising distal outer regions that each have outer surfaces for supporting the planet, a generally denticulate central outer surface region that engages the denticulate inner surface region of the output ring, and generally denticulate intermediate outer surface regions that each engage the denticulate inner surface region of a respective one of the stationary rings, and a planet axis of rotation that is generally parallel to the output ring axis; and a pair of generally cylindrical planet carriers, each having a carrier axis of rotation in general alignment with the output ring axis.

24 Claims, 4 Drawing Sheets

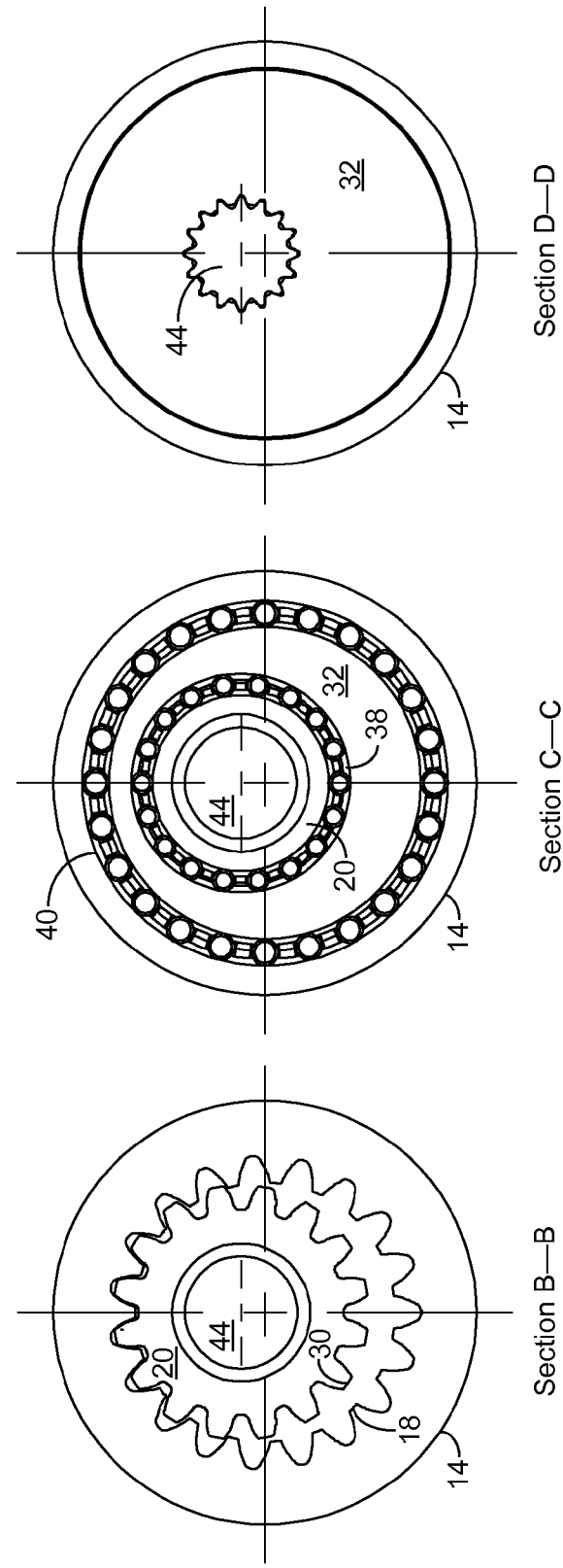

SINGLE PLANET GEAR ROTARY ACTUATOR

BRIEF DESCRIPTION OF THE DRAWINGS

FIGS. 3, 4 and 5 are cross-sectional end views of the actuator shown in FIG. 2 along sectional lines B-B, C-C and D-D, respectively.

DETAILED DESCRIPTION OF THE INVENTION

Figure 1:
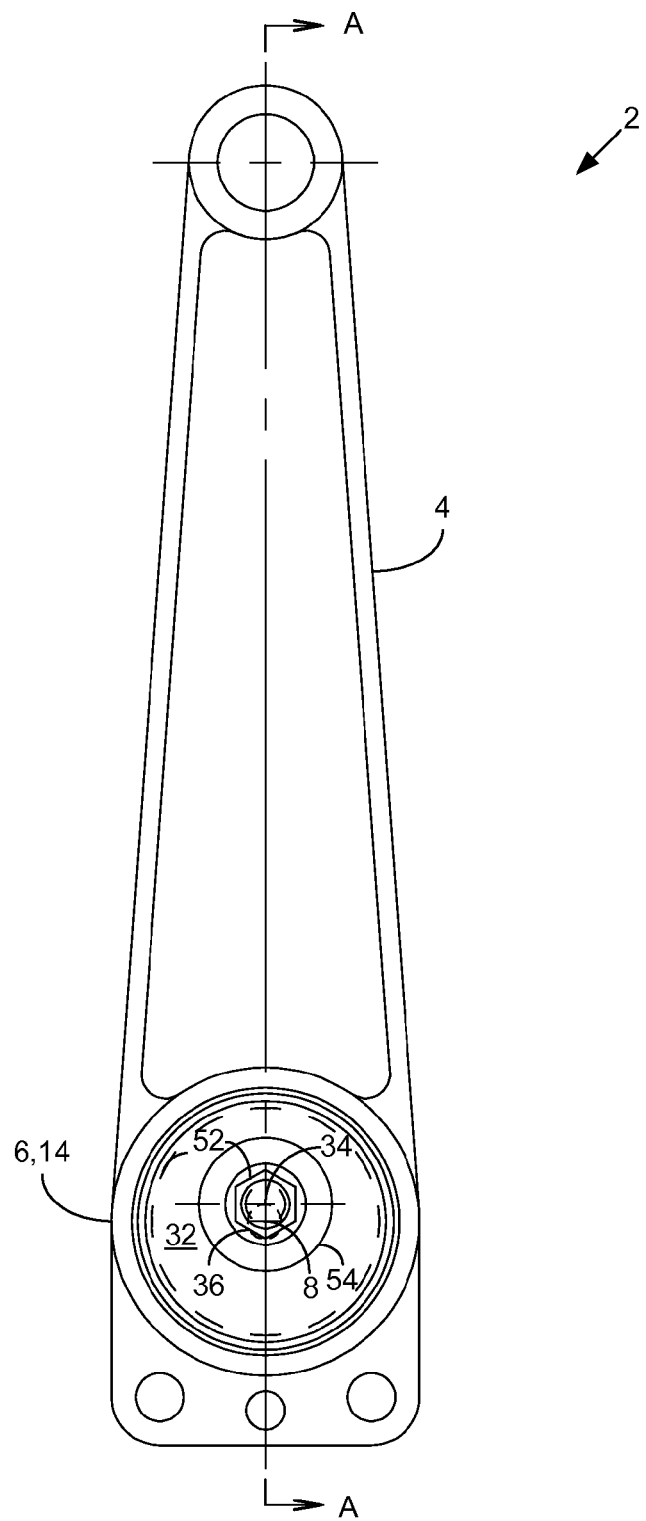
FIG. 1 is an end view of a rotary actuator according to a possible embodiment.
Figure 2:
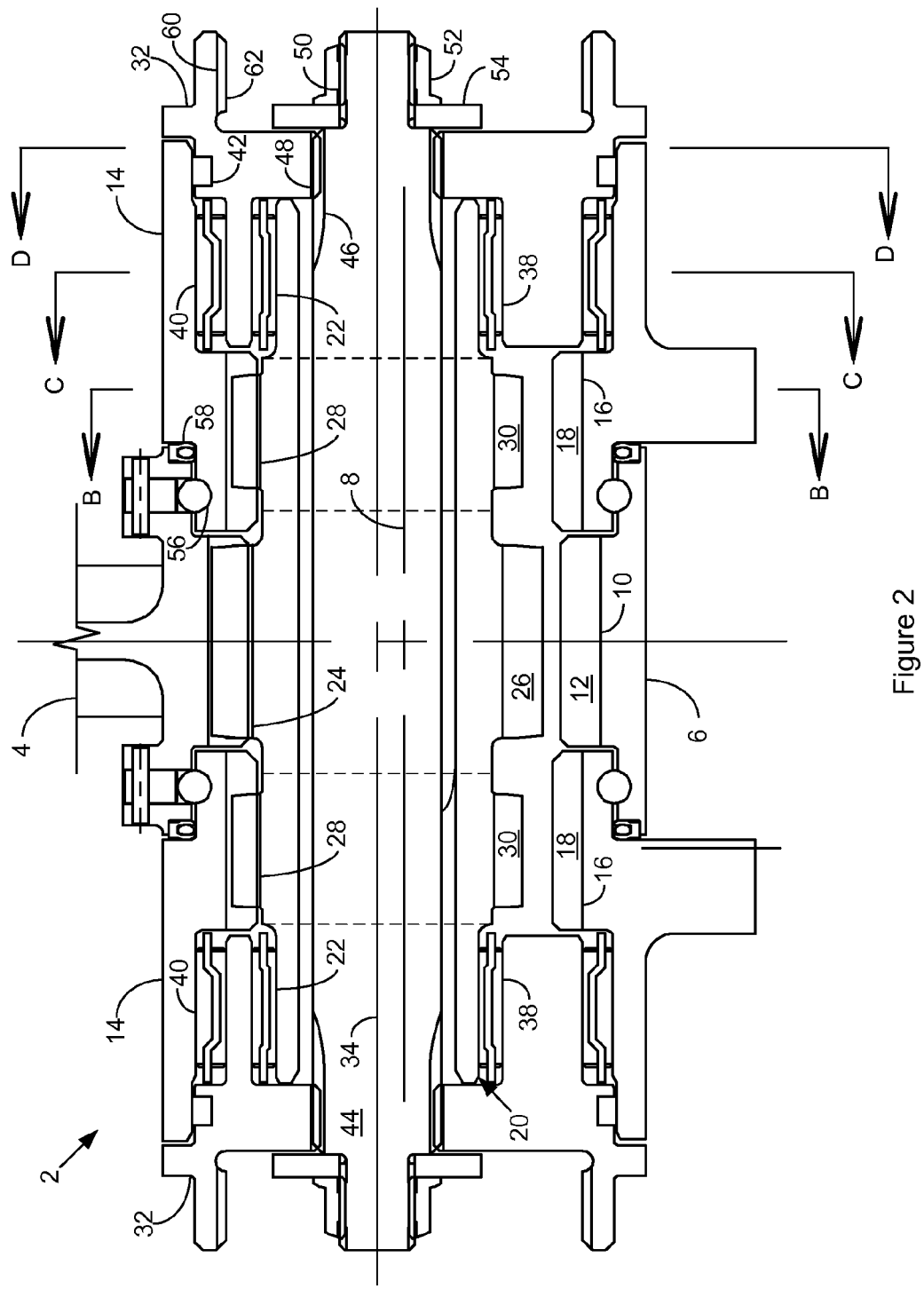
FIG. 2 is a cross-sectional side view of the actuator shown in FIG. 1 along sectional line A-A.

Referring to FIGS. 1 through 5 together, a rotary actuator 2 according to a possible embodiment comprises an actuator arm 4 coupled to an output ring 6 that is rotatable about an output ring axis of rotation 8. The output ring 6 has a generally denticulate inner surface region 10, such as with an internal face of gear teeth 12.

The actuator 2 also comprises a pair of stationary rings 14 each located on a different end of the output ring 6. Each stationary ring 14 has a generally denticulate inner surface region 16, such as with an internal face of gear teeth 18. Each of the stationary rings 14 has its stationary ring axis in general alignment with the output ring axis 8.

The actuator 2 further comprises a generally cylindrical planet 20 that has distal outer surface regions 22, a generally denticulate central outer surface region 24, such as with an external face of gear teeth 26, and generally denticulate intermediate outer surface regions 28, such as with an external face of gear teeth 30. The central outer surface region 24 engages the output ring inner surface region 10 by way of respective gear teeth 26 and 12. Since the pitch radius of the planet central outer surface region 24 is less than that of the output ring inner surface region 10, it necessarily has fewer gear teeth 26 than gear teeth 12 of the output ring inner surface region 10, and therefore there exists a gear ratio between the planet 20 and the output ring 6. Likewise, since the pitch radius of each planet intermediate outer surface region 28 is less than that of its respective stationary ring inner surface region 16, there exists a gear ratio between the planet 20 and each stationary ring 14. The pitch radius of the output ring inner surface region 10 may be different that the pitch radius of each stationary ring inner surface region 16, and likewise the pitch radius of the planet central outer surface region 24 may be different from the pitch radius of each planet intermediate outer surface region. Furthermore, the gear ratio between the planet 20 and the output ring 6 may be different from the gear ratio between the planet 20 and each stationary ring 14.

The actuator 2 further comprises a pair of generally cylindrical planet carriers 32. Each planet carrier 32 has a carrier axis of rotation in general alignment with the output ring axis 8. Each planet carrier 32 supports a respective one of the planet distal outer surface regions 22 to allow rotation of the planet 20 about a planet axis of rotation 34 and movement of the planet axis 34 about the output ring axis 8 in a generally circular path 36. The support may be by way of a respective planet supporting bearing 38, such as a needle bearing as shown.

Each stationary ring 14 may support a respective one of the planet carriers 32 to allow rotation of its respective planet carrier about the output ring axis 8. The support may be by way of a respective planet carrier supporting bearing 40, such as a needle bearing as shown. Each planet carrier 32 may also have a seal 42 along the interface with its respective stationary ring 14. The planet carriers 32 may couple together, such as by way of a tie bar 44 that passes through the planet 20 as shown. Each of distal ends of the tie bar 44 may have respective splines 46 that engage mating apertures 48 in the planet carriers 32 to prevent backlash upon rotation of the planet carriers 32. Each of the distal ends of the tie bar 42 may also have respective threads 50 to accept a respective mating nut 52 and lock washer 54.

Each stationary ring 14 may support a respective distal end of the output ring 6 to allow rotation of the output ring 6 about the output ring axis 8. The support may be by way of a respective output ring supporting bearing 56, such as a ball bearing as shown, or a journal bearing. Each distal end of the output ring 6 may also have a seal 58 along the interface with its respective stationary ring 14, such as the face seal 58 as shown.

Figure 6:
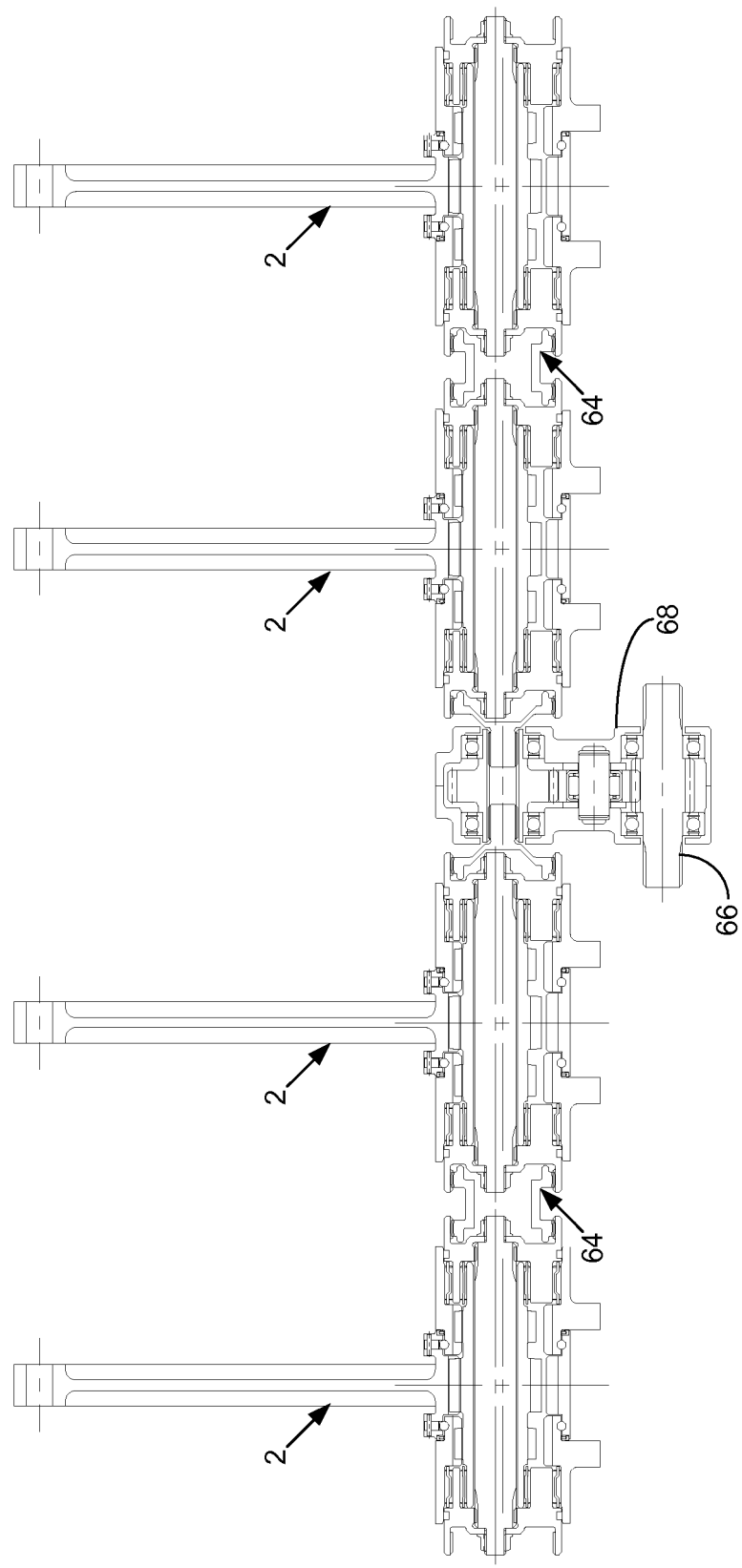
FIG. 6 is a side view of multiple actuators according to the possible embodiment coupled together by a single input shaft.

The outer distal end of each planet carrier 32 may have a coupling surface region 60 with spines 62 to couple the actuator to a mating crown spline torque shaft 64, as shown in FIG. 6. In this way, a single drive shaft 66 may drive multiple actuators 2 through a single drop box 68 and multiple respective crown spline torque shafts 64.

The described embodiment as set forth herein represents only an illustrative implementation of the invention as set forth in the attached claims. Changes and substitutions of various details and arrangement thereof are within the scope of the claimed invention.

The invention claimed is:

1. A rotary actuator comprising:
   a rotatable output ring with a generally denticulate inner surface region and an output ring axis of rotation;
   a pair of stationary rings, each with a generally denticulate inner surface region and a stationary ring axis, each located on a different end of the output ring with the stationary ring axes in general alignment with the output ring axis;
   a generally cylindrical planet comprising distal outer regions that each have outer surfaces for supporting the planet, a generally denticulate central outer surface region that engages the denticulate inner surface region of the output ring, and generally denticulate intermediate outer surface regions that each engage the denticulate inner surface region of a respective one of the stationary rings, and a planet axis of rotation that is generally parallel to the output ring axis; and
   a pair of generally cylindrical planet carriers, each having a carrier axis of rotation in general alignment with the output ring axis, each carrier supporting the outer surface of a respective one of the distal outer regions of the planet to allow rotation of the planet about the planet axis and movement of the planet axis about the output ring axis in a generally circular path as the planet carriers rotate about their carrier axes of rotation;
   wherein rotation of the planet carriers about their carrier axes cause the cylindrical planet to rotate about its planet axis as it moves through its circular path about the output ring axis, thereby causing the output ring to rotate.

2. The actuator of claim 1, wherein the denticulate inner surface regions of the output ring and the stationary rings and the denticulate outer surface regions of the planet comprise gear teeth.

3. The actuator of claim 2, wherein the gear ratio of the planet to each stationary ring is different from the gear ratio of the planet to the output ring.

4. The actuator of claim 2, wherein the pitch radius of the denticulate inner surface of the output ring is different from the pitch radius of the denticulate inner surface region of the stationary rings.

5. The actuator of claim 2, wherein the pitch radius of the denticulate outer surface of the planet central region is different from the pitch radius of the denticulate outer surface of the planet intermediate regions.

6. The actuator of claim 1, wherein each planet carrier supports its respective one of the distal outer regions of the planet by way of a bearing.

7. The actuator of claim 6, wherein each planet-supporting bearing comprises a needle bearing.

8. The actuator of claim 1, wherein each stationary ring supports a respective one of the planet carriers.

9. The actuator of claim 8, wherein each stationary ring supports its respective planet carrier by way of a bearing.

10. The actuator of claim 9, wherein each planet carrier supporting bearing comprises a needle bearing.

11. The actuator of claim 1, wherein the planet carriers couple together.

12. The actuator of claim 11, wherein the planet carriers couple together by way of a tie bar.

13. The actuator of claim 12, wherein the tie bar passes from one planet carrier to the other through the planet.

14. The actuator of claim 1, wherein each stationary ring supports a respective distal end of the output ring.

15. The actuator of claim 14, wherein each stationary ring supports its respective distal end of the output ring by way of a bearing.

16. The actuator of claim 15, wherein each output ring supporting bearing comprises a ball bearing.

17. The actuator of claim 1, wherein each planet carrier has a distal surface region with splines to couple to a mating crown spline torque shaft.

18. The actuator of claim 17, wherein the actuator couples to at least one additional actuator by means at least one of the mating crown spline shafts.

19. A rotary actuator comprising:
a rotatable output ring with gear teeth along an inner surface region and an output ring axis of rotation;
a pair of stationary rings, each with a gear teeth along an inner surface region and a stationary ring axis, each located on a different end of the output ring with the stationary ring axes in general alignment with the output ring axis and each stationary ring supporting a respective distal end of the output ring by way of a bearing;
a generally cylindrical planet comprising distal outer regions that each have outer surfaces for supporting the planet, a central region with gear teeth along an outer surface that engages the gear teeth of the inner surface region of the output ring, and intermediate outer surface regions, each peripheral outer surface region with gear teeth along an outer surface that engages the gear teeth of the inner surface region of a respective one of the stationary rings, and a planet axis of rotation that is generally parallel to the output ring axis; and
a pair of generally cylindrical planet carriers coupled together by way of a tie bar, with the stationary rings each supporting a respective one of the planet carriers by way of a bearing, each planet carrier having a carrier axis of rotation in general alignment with the output ring axis, each carrier supporting the outer surface of a respective one of the distal outer regions of the planet by way of a bearing to allow rotation of the planet about the planet axis and movement of the planet axis about the output ring axis in a generally circular path as the planet carriers rotate about their carrier axes of rotation;
wherein rotation of the planet carriers about their carrier axes cause the cylindrical planet to rotate about its planet axis as it moves through its circular path about the output ring axis, thereby causing the output ring to rotate.

20. The actuator of claim 19, wherein the gear ratio of the planet to the output gear is different from the gear ratio of the planet to the stationary rings.

21. The actuator of claim 19, wherein the planet supporting bearings and planet carrier supporting bearings comprise needle bearings.

22. The actuator of claim 19, wherein the output ring supporting bearings comprise ball bearings.

23. The actuator of claim 19, wherein each planet carrier has a distal surface region with splines to couple to a mating crown spline torque shaft for coupling the actuator to at least one additional actuator.

24. A rotary actuator comprising:
a rotatable output ring with gear teeth along an inner surface region and an output ring axis of rotation;
a pair of stationary rings, each with a gear teeth along an inner surface region and a stationary ring axis, each located on a different end of the output ring with the stationary ring axes in general alignment with the output ring axis and each stationary ring supporting a respective distal end of the output ring by way of a ball bearing;
a generally cylindrical planet comprising distal outer regions that each have outer surfaces for supporting the planet, a central region with gear teeth along an outer surface that engages the gear teeth of the inner surface region of the output ring, and intermediate outer surface regions, each peripheral outer surface region with gear teeth along an outer surface that engages the gear teeth of the inner surface region of a respective one of the stationary rings, and a planet axis of rotation that is generally parallel to the output ring axis; and
a pair of generally cylindrical planet carriers coupled together by way of a tie bar, with the stationary rings each supporting a respective one of the planet carriers by way of a needle bearing, each planet carrier having a carrier axis of rotation in general alignment with the output ring axis, each carrier supporting the outer surface of a respective one of the distal outer regions of the planet by way of a needle bearing to allow rotation of the planet about the planet axis and movement of the planet axis about the output ring axis in a generally circular path as the planet carriers rotate about their carrier axes of rotation, and each planet carrier has a distal surface region with splines to couple to a mating crown spline torque shaft for coupling the actuator to at least one additional actuator;
wherein rotation of the planet carriers about their carrier axes cause the cylindrical planet to rotate about its planet axis as it moves through its circular path about the output ring axis, thereby causing the output ring to rotate.

* * * * *